United States Patent
Aoyanagi

(10) Patent No.: US 11,628,363 B2
(45) Date of Patent: Apr. 18, 2023

(54) GAME PROCESSING METHOD AND RECORDING MEDIUM

(71) Applicant: Koei Tecmo Games Co., Ltd., Yokohama (JP)

(72) Inventor: Koki Aoyanagi, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 0 days.

(21) Appl. No.: 17/220,851

(22) Filed: Apr. 1, 2021

(65) Prior Publication Data
US 2021/0308577 A1   Oct. 7, 2021

(30) Foreign Application Priority Data

Apr. 2, 2020 (JP) .............................. JP2020-066456

(51) Int. Cl.
| | | |
|---|---|---|
| A63F 13/56 | (2014.01) | |
| A63F 13/577 | (2014.01) | |
| A63F 13/833 | (2014.01) | |
| A63F 13/285 | (2014.01) | |

(52) U.S. Cl.
CPC .......... *A63F 13/577* (2014.09); *A63F 13/285* (2014.09); *A63F 13/56* (2014.09); *A63F 13/833* (2014.09); *A63F 2300/1037* (2013.01); *A63F 2300/8029* (2013.01)

(58) Field of Classification Search
CPC ........ A63F 13/25; A63F 13/285; A63F 13/40; A63F 13/426; A63F 13/45; A63F 13/50; A63F 13/52; A63F 13/537; A63F 13/55; A63F 13/56; A63F 13/58; A63F 13/70; A63F 13/79; A63F 2300/303; A63F 2300/305; A63F 2300/306; A63F 2300/60; A63F 2300/63; A63F 2300/65
See application file for complete search history.

(56) References Cited

U.S. PATENT DOCUMENTS

2020/0086216 A1*  3/2020  Shimomoto ............ A63F 13/58

FOREIGN PATENT DOCUMENTS

JP          2019-103596          6/2019

OTHER PUBLICATIONS

Street Fighter 30th Anniversary Collection Launch Trailer—Nintendo Switch, https://www.youtube.com/watch?v=mqfqMeJHB_A, published May 29, 2018, 1 minute 32 seconds, youtube.*

* cited by examiner

*Primary Examiner* — Omkar A Deodhar
(74) *Attorney, Agent, or Firm* — Mori & Ward, LLP

(57) ABSTRACT

A game processing method executed by an information processing device includes moving an ally character on a field in accordance with a player's operation, executing a fight with an enemy character on the field in accordance with the player's operation when the ally character encounters the enemy character, and adding a second motion for vibrating the enemy character to a first motion being executed by the enemy character, when an attack of the ally character hits the enemy character.

9 Claims, 7 Drawing Sheets

[FIG. 1]
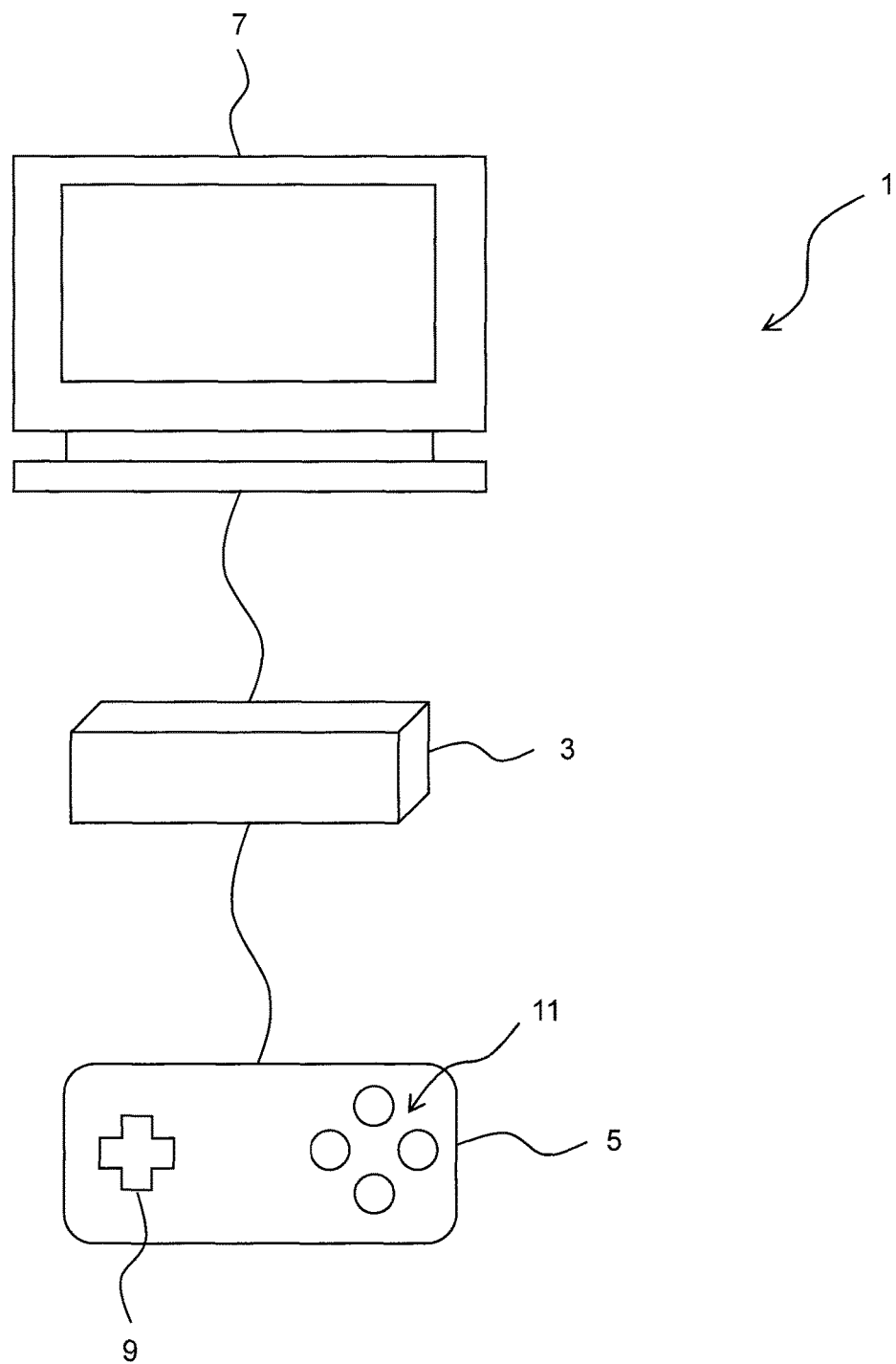

[FIG. 2]
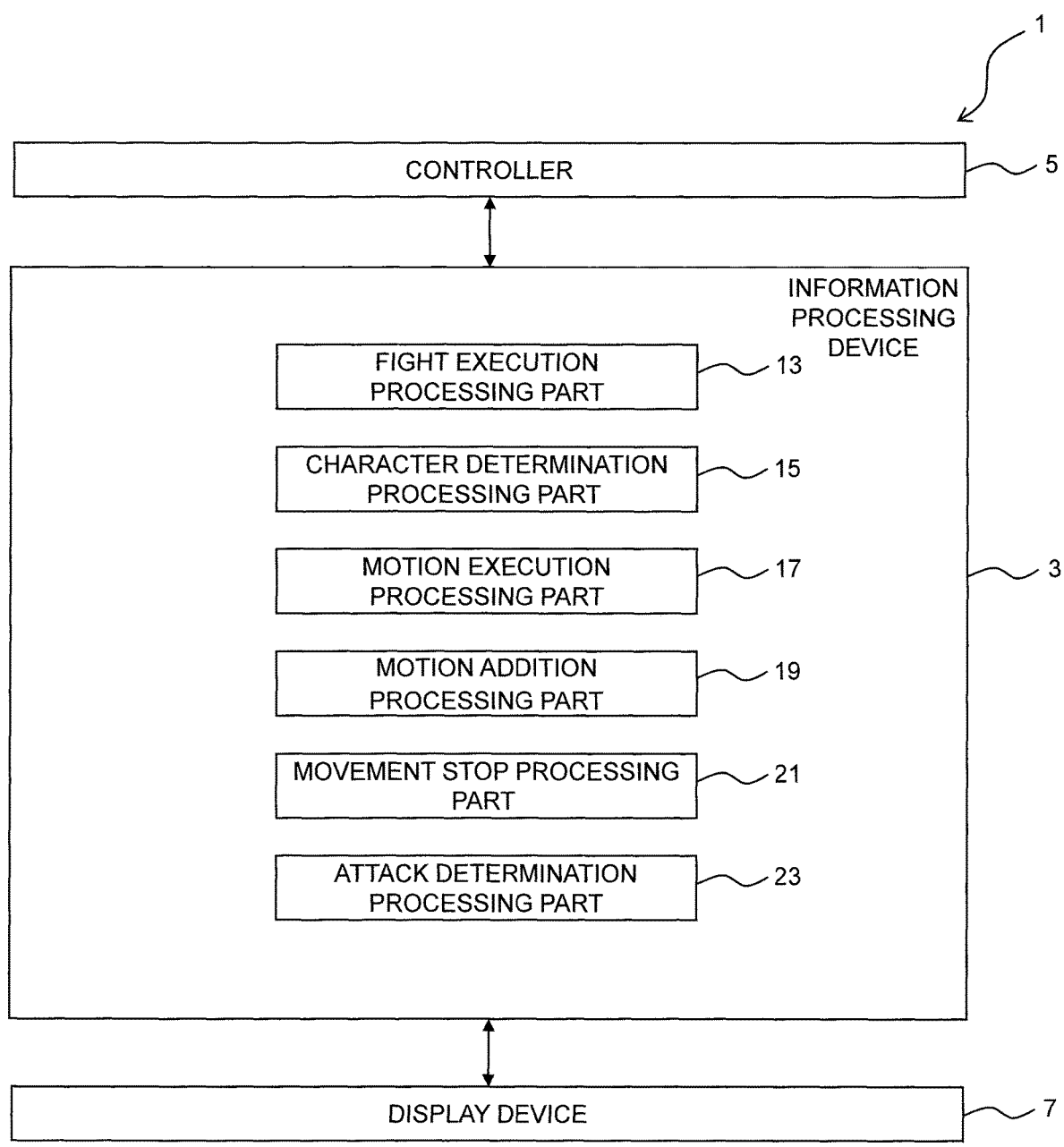

[FIG. 3]
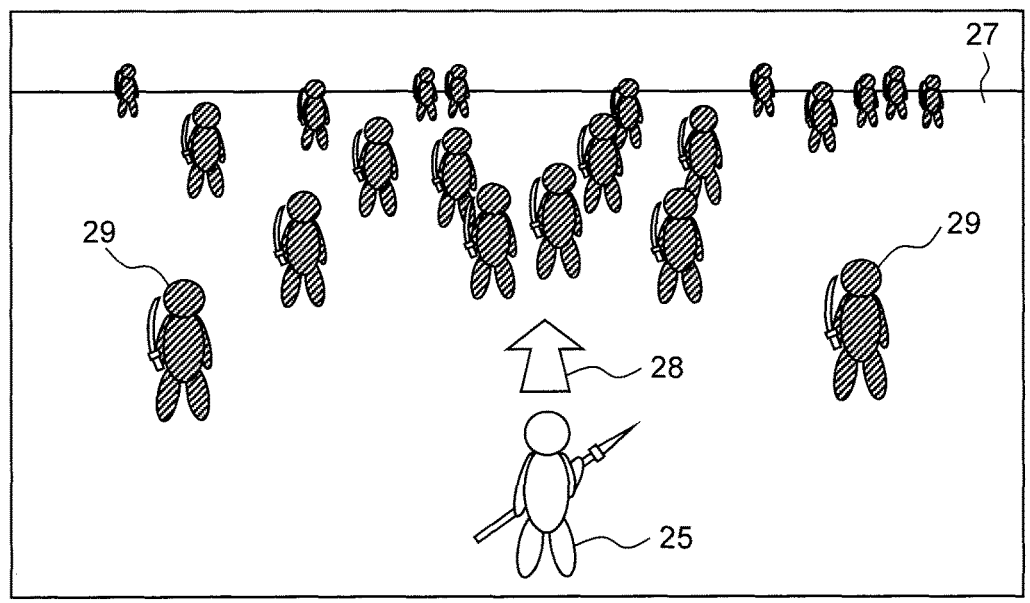
[FIG. 4]
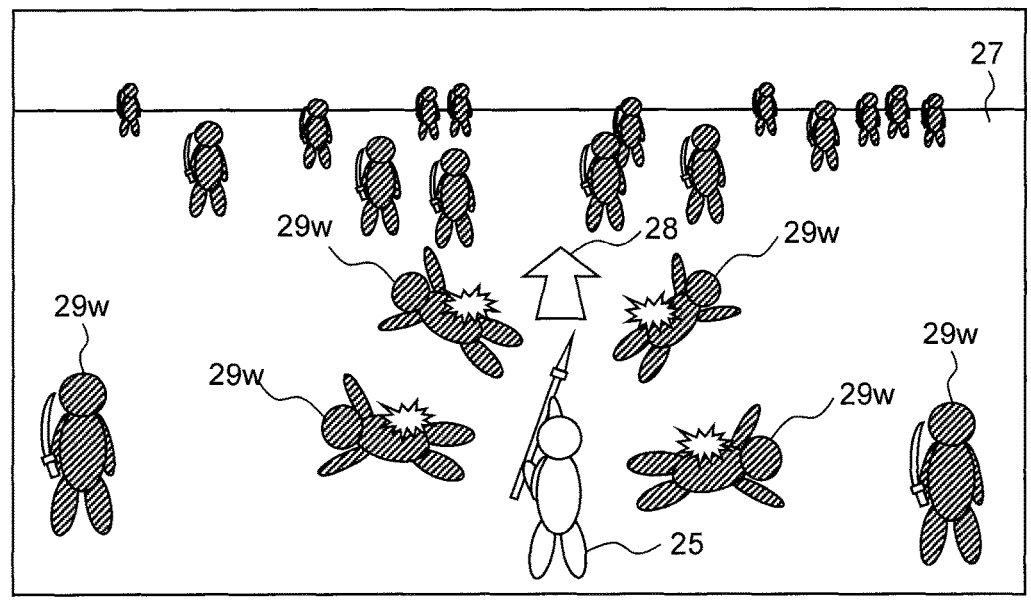

[FIG. 5]
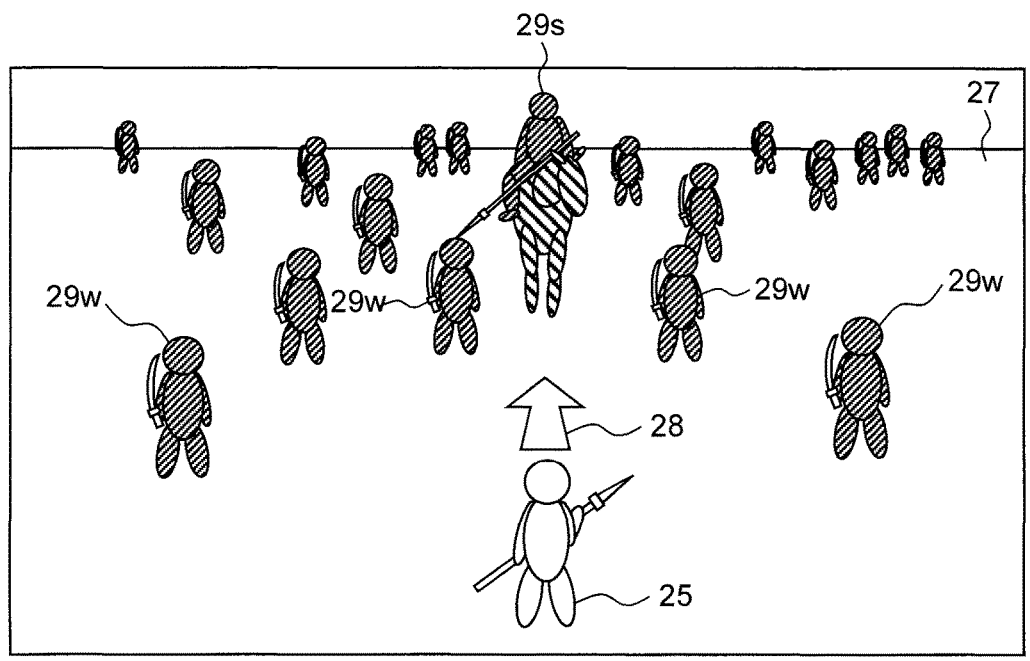
[FIG. 6]
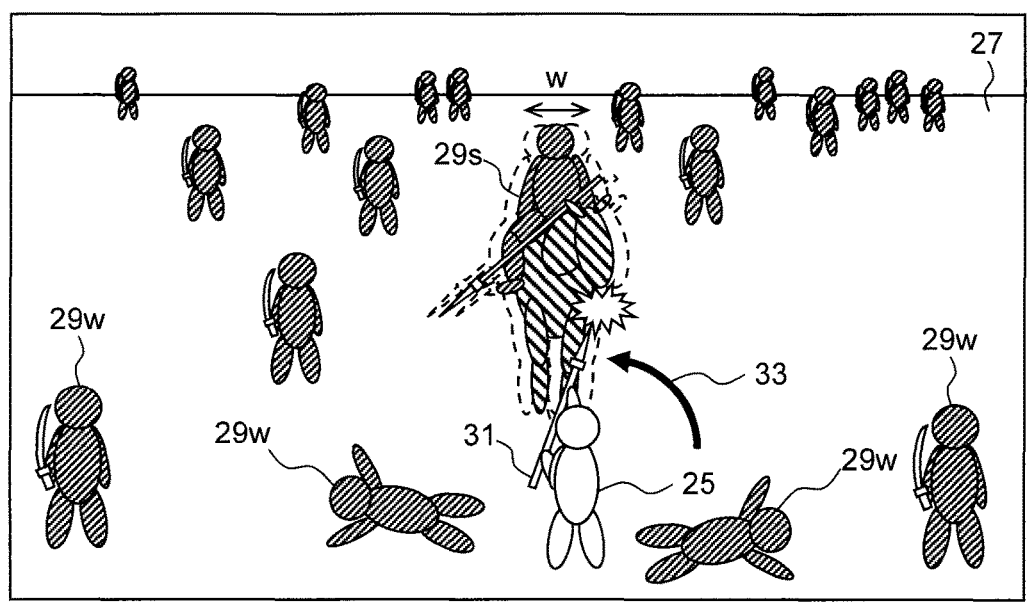

[FIG. 7]
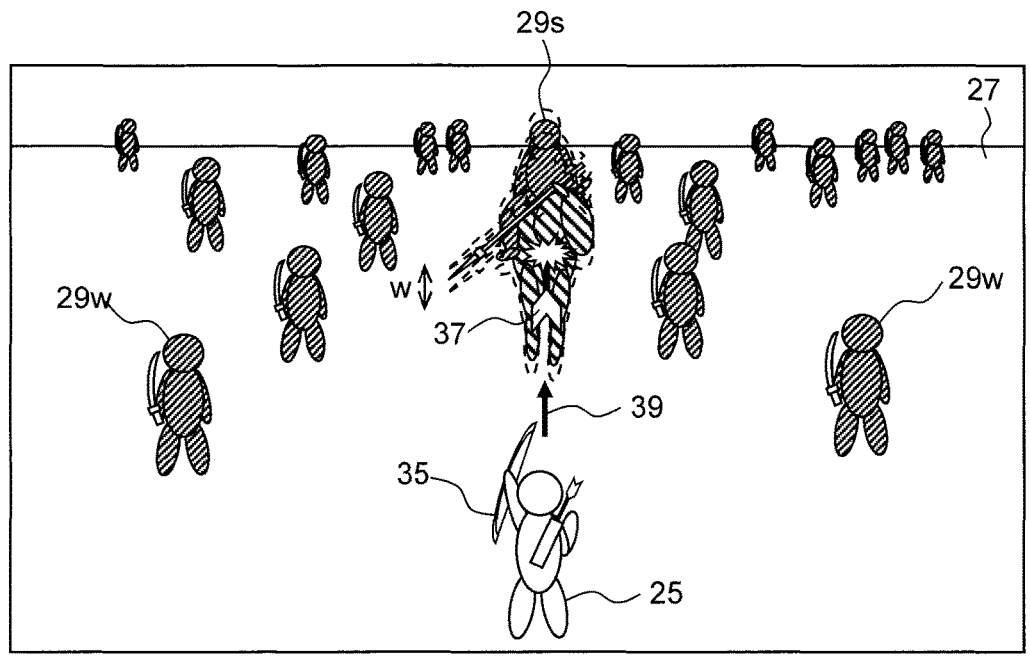
[FIG. 8]
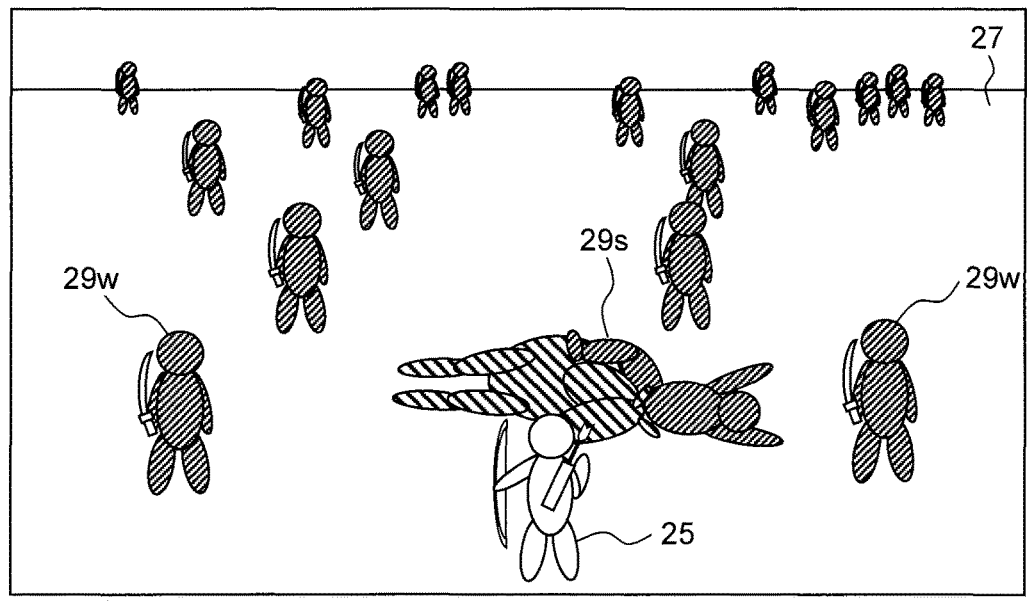

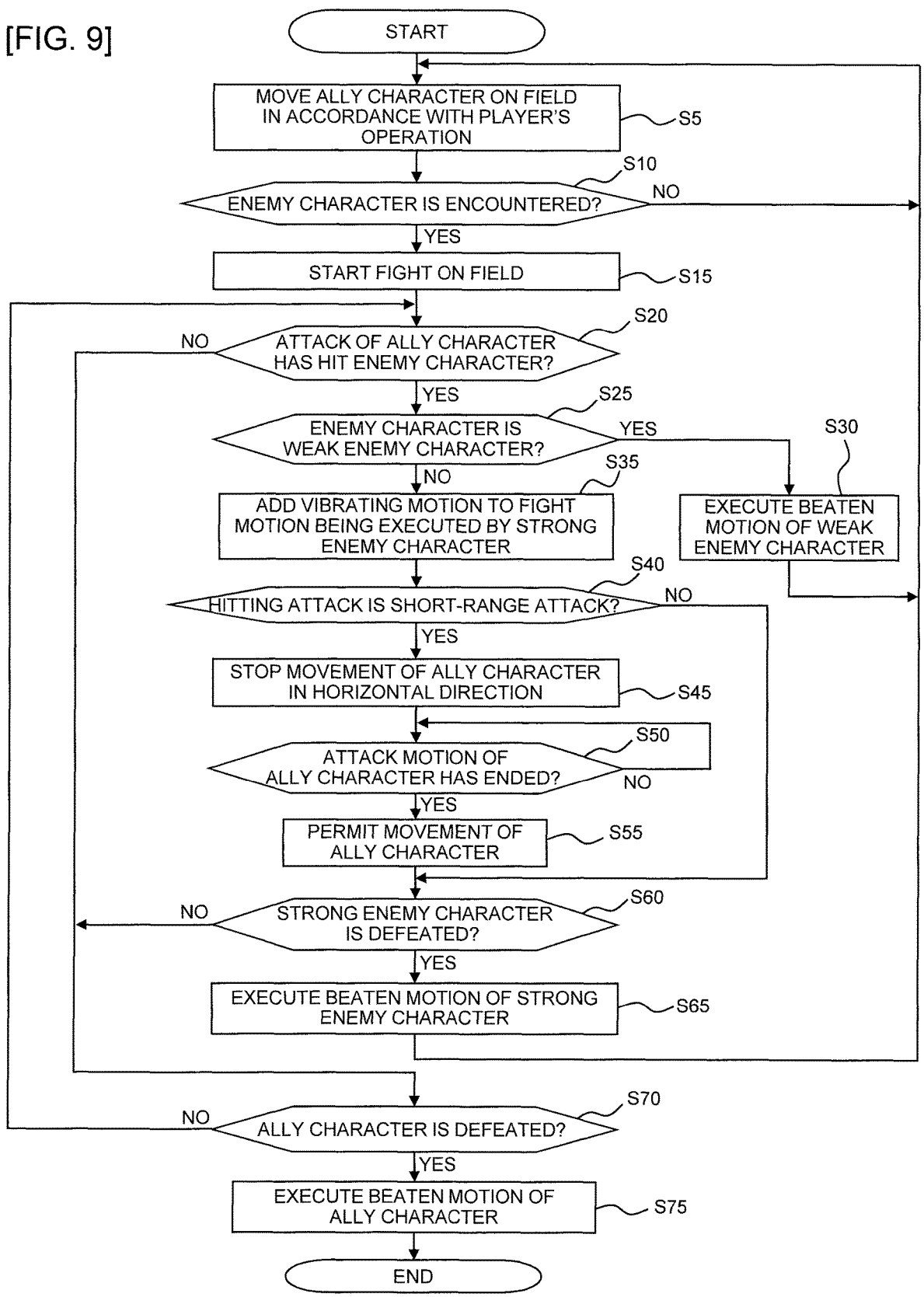
[FIG. 9]

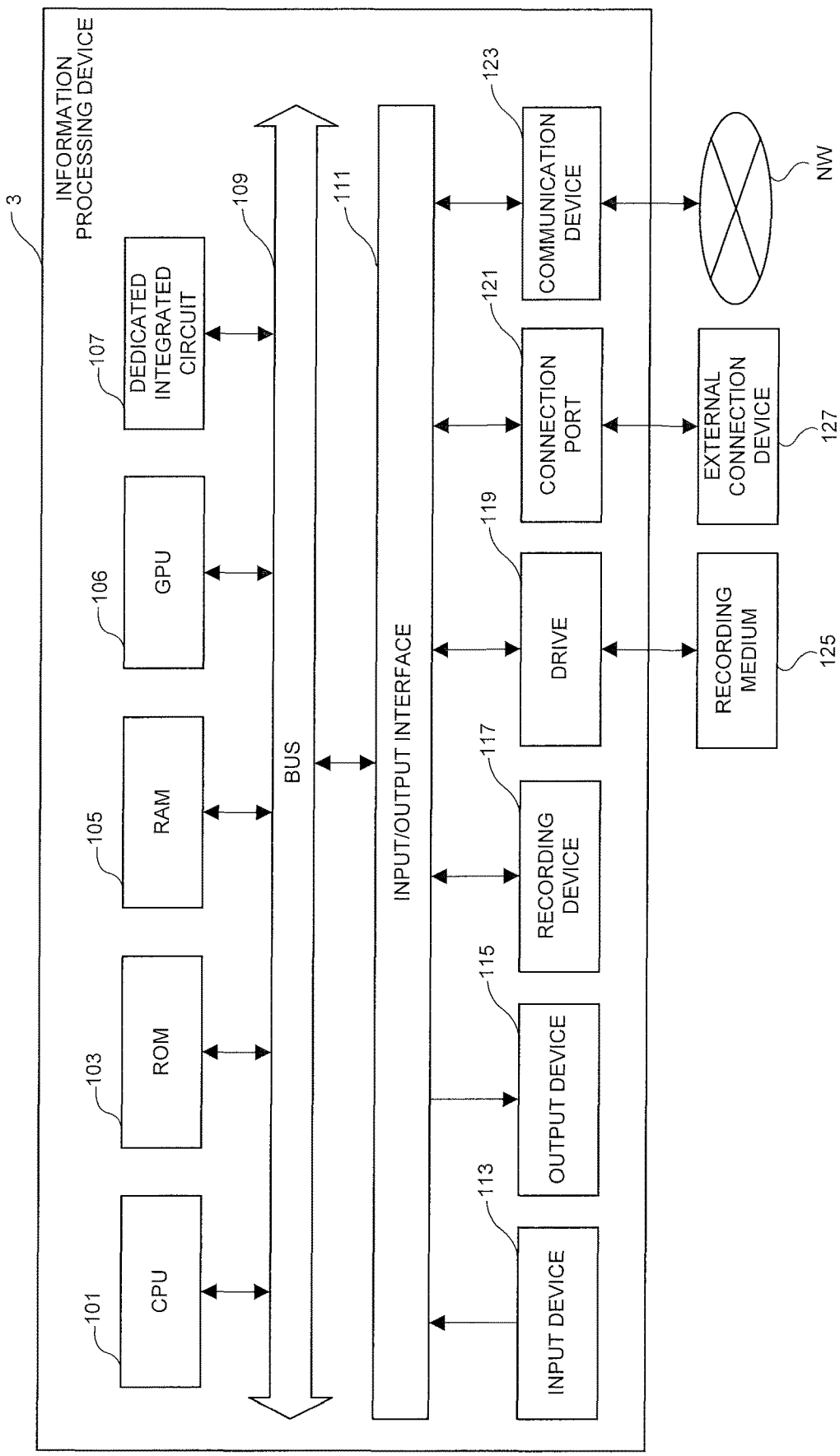
[FIG. 10]

GAME PROCESSING METHOD AND RECORDING MEDIUM

CROSS-REFERENCE TO RELATED APPLICATION

The present application is based upon and claims the benefit of priority to Japanese Patent Application No. 2020-66456, filed Apr. 2, 2020. The entire contents of this application are incorporated herein by reference.

BACKGROUND OF THE INVENTION

Technical Field

The present invention relates to a game processing method and a recording medium.

Description of Background Art

A so-called action role-playing game is conventionally known in which an ally character operated by a player advances a story while fighting with enemy characters. In one of such games, for example, a game described in JP,A,2019-103596, when an ally character encounters an enemy character on a game field, a fight is performed directly on the game field, and the ally character acts in real time in conjunction with a player's operation during the fight.

SUMMARY OF THE INVENTION

In a game like the prior art, when an ally character attacks and defeats an enemy character, a predetermined motion (hereinafter, appropriately referred to as "beaten motion") is performed to represent that the enemy character is defeated. However, in the case of a strong enemy that cannot easily be defeated, the player attacks many times before defeating the enemy, and the beaten motion is not performed during this period, which causes a problem that the player hardly feels a response to a hit of the attack.

The present invention was conceived in view of such a problem and it is therefore an object of the present invention to provide a game processing method and a recording medium capable of improving an amusing property by representing a response to a hit of an attack.

Means for Solving the Problem

According to one aspect of the present invention, a game processing method executed by an information processing device includes moving an ally character on a field in accordance with a player's operation, executing a fight with an enemy character on the field in accordance with the player's operation when the ally character encounters the enemy character, and adding a second motion for vibrating the enemy character to a first motion being executed by the enemy character, when an attack of the ally character hits the enemy character.

According to another aspect of the present invention, a non-transitory recording medium readable by an information processing device, the recording medium storing a game program programmed to cause the information processing device to move an ally character on a field in accordance with a player's operation, execute a fight with an enemy character on the field in accordance with the player's operation when the ally character encounters the enemy character, and add a second motion for vibrating the enemy character to a first motion being executed by the enemy character, when an attack of the ally character hits the enemy character.

Advantages of the Invention

According to the game processing method and a recording medium of the present invention, an amusing property can be improved by representing a response to a hit of an attack.

BRIEF DESCRIPTION OF THE DRAWINGS

FIG. 1 is a system configuration diagram showing an example of an overall configuration of a game system according to an embodiment.

FIG. 2 is a block diagram showing an example of a functional configuration of an information processing device.

FIG. 3 is an explanatory view showing an example of a game screen when an ally character encounters enemy characters while moving on a field.

FIG. 4 is an explanatory view showing an example of a game screen when an attack of the ally character hits a weak enemy character.

FIG. 5 is an explanatory view showing an example of a game screen when the ally character encounters enemy characters including a strong enemy character.

FIG. 6 is an explanatory view showing an example of a game screen when a short-range attack of the ally character hits the strong enemy character.

FIG. 7 is an explanatory view showing an example of a game screen when a long-range attack of the ally character hits the strong enemy character.

FIG. 8 is an explanatory view showing an example of a game screen when the strong enemy character is defeated by the attacks of the ally character.

FIG. 9 is a flowchart showing an example of process procedures performed by the information processing apparatus.

FIG. 10 is a block diagram showing an example of a hardware configuration of the information processing device.

DETAILED DESCRIPTION OF THE EMBODIMENTS

An embodiment of the present invention will now be described with reference to the drawings.

1. Overall Configuration of the Game System

First, an example of an overall configuration of a game system 1 according to this embodiment will be described with reference to FIG. 1. As shown in FIG. 1, the game system 1 includes an information processing device 3, a game controller 5, and a display device 7. The game controller 5 and the display device 7 are each communicably connected to the information processing device 3 in a wired or wireless manner.

The information processing device 3 is a stationary game machine, for example. However, the information processing device 3 is not limited thereto and may be a portable game machine integrally including an input part and a display part. Other than the game machine, for example, the information processing device 3 may be one of those manufactured and sold as computers such as server computers, desktop computers, notebook computers, and tablet computers or those manufactured and sold as telephones such as portable telephones, smartphones, and phablets.

The player uses the game controller 5 to input various operations. In the example shown in FIG. 1, the game controller 5 has a cross key 9 and multiple buttons 11, for example. Alternatively, or additionally, the game controller 5 may have a joystick and a touch pad, for example.

2. Outline of Content of Game

Description will be made of an example of an outline of content of a game according to this embodiment, i.e., a game provided by the information processing device 3 executing a game program and a game processing method of the present invention.

The game according to this embodiment is a so-called action role-playing game in which an ally character advances a story while fighting with enemy characters. The ally character is operated by the player, and the enemy characters are automatically controlled by a predetermined algorithm (so-called game AI) defined by the game program. When multiple ally characters exist, the ally characters may include characters operated by the game program (so-called non-player characters). When the ally character moves on a field and encounters an enemy character, a fight is performed directly on the screen of the field. During the fight, the ally character acts in real time in conjunction with a player's operation.

In the case of the example described in this embodiment, the characters appearing in the game are human characters (e.g., military commanders, resourceful generals, and cavalry, including men and women). However, in addition to the human characters, for example, the characters may be animals other than humans, creatures other than humans and animals, virtual creatures (e.g., monsters, ghosts, and yokai), robots, and objects such as articles and goods.

If an attack of the ally character hits the enemy character during the fight performed on the screen of the field as described above, the enemy character is temporarily vibrated by adding a second motion to a first motion being executed. This will hereinafter be described in detail.

3. Functional Configuration of Information Processing Device

An example of a functional configuration of the information processing device 3 will be described with reference to FIG. 2.

As shown in FIG. 2, the information processing device 3 includes a fight execution processing part 13, a character determination processing part 15, a motion execution processing part 17, a motion addition processing part 19, a movement stop processing part 21, and an attack determination processing part 23.

The fight execution processing part 13 executes a fight between the ally character and the enemy character. Specifically, the fight execution processing part 13 moves the ally character on the field in accordance with a player's operation, and when the ally character encounters the enemy character, the fight execution processing part 13 executes the fight with the enemy character on the field. The term "encounter" as used herein means that a predetermined fight starting condition is satisfied such as that at least one of the ally character and the enemy character attacks the other character or that the ally character and the enemy character approach each other within a predetermined distance. The fight is performed directly on the field without switching from a screen of the field displaying the movement of the ally character to another screen for a fight (e.g., a fight screen in which the fight proceeds in turn, or a screen on which the player selects a character's action from menu items prepared in advance). In other words, the movement of the ally character and the fight with the enemy character are seamlessly performed on the field. However, on the field screen, an effect may be inserted between a movement phase and a fight phase, or a character may be enlarged, reduced, rotated, etc. by camera work. During the fight, the ally character executes actions (e.g., movement, attack, avoidance, defense) related to the fight corresponding to the player's operation in real time in conjunction with the player's operation.

The character determination processing part 15 determines whether the enemy character hit by the attack of the ally character is a weak enemy character (so-called normal character) that can relatively easily be defeated, or a strong enemy character (so-called boss character) that is tough and hard to defeat. The weak enemy character is an enemy character that can be defeated by, for example, one or several attacks of the ally character, and the strong enemy character is an enemy character that requires, for example, 10 or more attacks or a special attack (attack using a special item, skill, magic, etc.) for defeating.

The motion execution processing part 17 executes motions that are various actions of the ally character and the enemy characters during the fight. Specifically, the motion execution processing part 17 executes motions such as movement, attack, avoidance, and defense during fight (hereinafter, appropriately referred to as "fight motion") for each of the ally character, the strong enemy character, and the weak enemy character, for example, and a motion (hereinafter, appropriately referred to as "beaten motion") representing that a character has been attacked or defeated for each of the ally character, the strong enemy character, and the weak enemy character, for example.

When the attack of the ally character hits the strong enemy character, the motion addition processing part 19 adds a vibrating motion (an example of the second motion) for vibrating the strong enemy character to the fight motion (an example of the first motion) being executed by the strong enemy character in accordance with the motion execution processing part 17. Specifically, the motion addition processing part 19 executes a process of adding a relative movement value from the fight motion for vibrating the strong enemy character to the fight motion being executed by the strong enemy character. As a result, vibration can be applied regardless of the motion of the strong enemy character. The motion addition processing part 19 executes the process only for the strong enemy character and does not execute the process for the weak enemy character.

The number of vibrations is set to, for example, once so that the vibration temporarily occurs at the timing when the attack of the ally character hits the strong enemy character. Therefore, the motion addition processing part 19 adds one vibrating motion to the fight motion being executed by the strong enemy character. However, the vibrating motion may be applied so that the strong enemy character vibrates multiple times.

A direction of vibration is set to a direction corresponding to the direction in which the strong enemy character is attacked. Therefore, the motion addition processing part 19 adds the vibrating motion so that the strong enemy character vibrates in the direction corresponding to the direction of being hit by the attack. For example, the vibrating motion is added such that the enemy character attacked from the front or back vibrates in the front-back direction, that the enemy character attacked from the right or left vibrates in the left-right direction, and that the enemy character attacked in a diagonal direction from the front or back vibrates in the diagonal direction.

A range of the vibration is set to a slight amount (e.g., an amount smaller than a width in the vibration direction of the body of the enemy character) on both sides in the vibration direction across the position of the enemy character at the time of application of the vibration such that the attacked enemy character is depicted as shaking. This range is set to a different value in accordance with the kind of the enemy character and is kept as a resource of each character. Therefore, the motion addition processing part 19 adds the second motion having a different range based on the kind of the enemy character hit by the attack of the ally character.

For example, when the enemy character equipped with soft and easily-shaking equipment is largely vibrated, the character is unnaturally depicted if the equipment does not shake, so that the character is vibrated with a relatively small range. For example, if the enemy character in a stable posture (e.g., a character in a firmly standing posture or a cavalryman) is largely vibrated, the character is unnaturally depicted, so that the character is vibrated with a relatively small range. Conversely, for example, when the enemy character equipped with hard and hardly-shaking equipment is largely vibrated, the character is not depicted unnaturally even if the equipment does not shake, so that the character is vibrated with a relatively large range. For example, even if the enemy character in an unstable posture (e.g., a floating character or an infantry) is largely vibrated, the character is not depicted unnaturally, so that the character is vibrated with a relatively large range. In addition to the equipment and posture, the range may be changed in accordance with the character's body type, gender, ability value, other status, etc.

When the attack of the ally character hits the strong enemy character, the movement stop processing part 21 stops the movement of the ally character in a direction parallel to the field regardless of the player's operation. "Movement in a direction parallel to the field" means, for example, a horizontal direction when the field is a horizontal plane (ground, a floor surface of a building, etc.), and a direction parallel to a slope when the field is inclined (hill, mountain road, stairs, etc.). Additionally, the movement stop processing part 21 stops the movement of the ally character during execution of an attack motion (an example of a third motion) that is an action of the attack of the ally character having hit the enemy character and cancels the stop when the attack motion ends.

The movement stop processing part 21 executes the process only for the strong enemy character and does not execute the process for the weak enemy character. Additionally, the movement stop processing part 21 stops the movement of the ally character if an attack determination processing part 23 described later determines that the attack of the ally character having hit the enemy character is a short-range attack and does not execute the process if the attack is determined as a long-distance attack.

The attack determination processing part 23 determines whether the attack of the ally character having hit the enemy character is a short-range attack or a long-range attack. The "short-range attack" is an attack performed by the ally character against the enemy character at relatively short range, for example, a hand-to-hand attack using the limbs, an attack using a non-projectile weapon such as a katana, a sword, a spear, or an ax, and a special attack (magic, skill, etc.) activated at short range. The "long-distance attack" is an attack performed by the ally character against the enemy character at relatively long range, for example, an attack using a projectile weapon such as a bow and arrow, a stone, and a gun, and a special attack (magic, skill, etc.) activated at long range.

The processes etc. or the processing parts are not limited to the example of allocation of these processes and, for example, the processes may be executed by a fewer number of processing parts (e.g., one processing part) or may be executed by more finely divided processing parts. The functions of the processing parts are implemented by a game program executed by a CPU 101 (see FIG. 10) described later or may partially be implemented by actual devices such as dedicated integrated circuits including ASICs and FPGAs, and other electric circuits, for example.

4. Game Screen

An example of the game screen will be described with reference to FIGS. 3 to 8. In FIGS. 3 to 8, an ally character 25 is shown in white and enemy characters 29 are shown by hatching for easy distinction.

The fight execution processing part 13 moves the ally character 25 on a field 27 in accordance with a player's operation. As shown in FIG. 3, when the ally character 25 encounters the enemy characters 29, a fight with the enemy characters 29 is directly executed on the screen of the field 27 without transition from the screen of the field 27 to another fight screen. For example, in FIG. 3, the ally character 25 moves and rushes into a large number of the enemy characters 29 in a screen depth direction (direction of an arrow 28) to engage in a fight. The arrow 28 is shown for convenience of explanation and is not displayed on the game screen (the same applies to FIGS. 4 and 5 described later).

As shown in FIG. 4, when the attack of the ally character 25 hits the enemy character 29, the character determination processing part 15 determines whether the enemy character 29 hit by the attack is a weak enemy character 29w or a strong enemy character 29s. The motion execution processing part 17 then executes a motion in accordance with a determination result. For example, in FIG. 4, the ally character 25 attacks the enemy characters 29 while moving in the direction of the arrow 28, and the enemy characters 29 hit by the attack is determined as the weak enemy characters 29w, and the "beaten motion" is executed to represent that the weak enemy character 29w is blown off and knocked down.

FIG. 5 shows the case that the enemy characters 29 include the strong enemy character 29s. In this example, the strong enemy character 29s is a cavalryman commanding the weak enemy characters 29w that are infantry soldiers, for example. In FIG. 5, the ally character 25 moves and rushes into the multiple weak enemy characters 29w and the strong enemy character 29s in the direction of the arrow 28.

As shown in FIG. 6, when the attack of the ally character 25 hits the strong enemy character 29s, the motion addition processing part 19 adds to the fight motion being executed by the strong enemy character 29s the vibrating motion causing the strong enemy character 29s to vibrate with a range w. In the example shown in FIG. 6, the ally character 25 is equipped with a spear 31 as a weapon and swings the spear 31 in a direction of an arrow 33 to attack so that the strong enemy character 29s is attacked from the right when viewed from the ally character 25 (from the left when viewed from the strong enemy character 29s). As a result, the strong enemy character 29s vibrates in the left-right direction, for example, once at the moment when the attack hits, in addition to the fight motion being executed.

In FIG. 6, the attack determination processing part 23 determines whether the attack of the ally character 25 having hit the strong enemy character 29s is the short-range attack or the long-range attack, and it is determined in accordance with the determination result whether the movement stop processing part 21 executes a movement stop process for the ally character 25. In the example shown in FIG. 6, since the ally character 25 is attacking with the spear 31, the attack is determined as the short-range attack. As a result, even if the player is performing a movement operation of the ally character 25, the movement stop processing part 21 stops the movement of the ally character 25 in the direction parallel to the field 27 (horizontal direction). The movement of the ally character 25 in a direction perpendicular to the field 27 (e.g., jump) is not restricted. Therefore, for example, a motion such as a jump of the ally character 25 is executed. When the attack motion using the spear 31 of the ally character 25 having hit the strong enemy character 29s ends, the stop is cancelled, so that the ally character 25 can move in the direction parallel to the field 27.

FIG. 7 shows the case that the attack of the ally character 25 having hit the strong enemy character 29s is the long-range attack. In the example shown in FIG. 7, the ally character 25 is equipped with a bow 35 as a weapon and shoots an arrow 37 to the strong enemy character 29s in a direction of an arrow 39 so that the strong enemy character 29s is attacked in the direction of the ally character 25 (from the front when viewed from the strong enemy character 29s). As a result, the strong enemy character 29s vibrates in the front-back direction, for example, once at the moment when the attack hits, in addition to the fight motion being executed.

In the case of FIG. 7, since the attack is the long-range attack, the movement stop process for the ally character 25 is not executed by the movement stop processing part 21. Therefore, the ally character 25 can move freely even when the attack hits.

FIG. 8 shows the case that the ally character 25 defeats the strong enemy character 29s. In FIG. 8, the motion execution processing part 17 executes the "beaten motion" representing that the strong enemy character 29s is defeated.

5. Process Procedures Performed by Information Processing Device

Description will be made of an example of process procedures performed by the CPU 101 of the information processing device 3 when a fight between the ally character 25 and the enemy character 29 is executed, with reference to FIG. 9.

At step S5, the information processing device 3 uses the fight execution processing part 13 to move the ally character 25 on the field 27 in accordance with the player's operation.

At step S10, the information processing device 3 uses the fight execution processing part 13 to determine whether the ally character 25 has encountered the enemy character 29. If the ally character 25 has not encountered the enemy character 29 (step S10: NO), the process returns to step S5. On the other hand, if the ally character 25 has encountered the enemy character 29 (step S10: YES), the process goes to step S15.

At step S15, the information processing device 3 uses the fight execution processing part 13 to start a fight between the ally character 25 and the enemy character 29 on the screen of the field 27.

At step S20, the information processing device 3 uses the fight execution processing part 13 to determine whether an attack of the ally character 25 has hit the enemy character 29. If the attack has not hit (step S20: NO), the process goes to step S70 described later. On the other hand, if the attack has hit (step S20: YES), the process proceeds to step S25.

At step S25, the information processing device 3 uses the character determination processing part 15 to determine whether the enemy character 29 hit by the attack of the ally character 25 is the weak enemy character 29w or the strong enemy character 29s. If the enemy character 29 hit by the attack is the weak enemy character 29w (step S25: YES), the process goes to step S30.

At step S30, the information processing device 3 uses the motion execution processing part 17 to execute the "beaten motion" representing that the weak enemy character 29w is attacked or defeated. Subsequently, the process returns to step S5.

On the other hand, at step S25, if the enemy character 29 hit by the attack is the strong enemy character 29s (step S25: NO), the process goes to step S35.

At step S35, the information processing device 3 uses the motion addition processing part 19 to add the vibrating motion for vibrating the strong enemy character 29s to the fight motion being executed by the strong enemy character 29s.

At step S40, the information processing device 3 uses the attack determination processing part 23 to determine whether the attack of the ally character 25 having hit the strong enemy character 29s is the short-range attack or the long-range attack. If the hitting attack is the long-range attack (step S40: NO), the process goes to step S60 described later. On the other hand, if the hitting attack is the short-range attack (step S40: YES), the process goes to step S45.

At step S45, the information processing device 3 uses the movement stop processing part 21 to stop the movement of the ally character 25 in the horizontal direction on the field 27.

At step S50, the information processing device 3 uses the movement stop processing part 21 to determine whether the attack motion of the hitting attack by the ally character 25 has ended. This step S50 is repeated until the attack motion ends (step S50: NO), and when the attack motion has ended (step S50: YES), the process goes to step S55.

At step S55, the information processing device 3 uses the movement stop processing part 21 to cancel the stop of the movement of the ally character 25 in the horizontal direction.

At step S60, the information processing device 3 uses the fight execution processing part 13 to determine whether the strong enemy character 29s is defeated. If the strong enemy character 29s is not defeated (step S60: NO), the process goes to step S70 described later. On the other hand, when the strong enemy character 29s is defeated (step S60: YES), the process goes to step S65.

At step S65, the information processing device 3 uses the motion execution processing part 17 to execute the "beaten motion" representing that the strong enemy character 29s is defeated. Subsequently, the process returns to step S5.

At step S70, the information processing device 3 uses the fight execution processing part 13 to determine whether the ally character 25 is defeated. If the ally character 25 is not defeated (step S70: NO), the process returns to step S20. On the other hand, when the ally character 25 is defeated (step S70: YES), the process goes to step S75.

At step S75, the information processing device 3 uses the motion execution processing part 17 to execute the "beaten motion" representing that the ally character 25 is defeated. This flow is then terminated.

The process procedures described above are an example, and the procedures may at least partially be deleted or changed or a procedure other than the above may be added. The order of the procedures may at least partially be changed, or multiple procedures may be combined into a single procedure.

6. Effect of Embodiment

As described above, the game program of this embodiment drives the information processing device 3 to act as the fight execution processing part 13 moving the ally character 25 on the field 27 in accordance with the player's operation and executing a fight with the enemy character 29 on the screen of the field 27 when the ally character 25 encounters the enemy character 29, and the motion addition processing part 19 adding the vibrating motion for vibrating the enemy character 29 to the fight motion being executed by the enemy character 29 when the attack of the ally character 25 hits the enemy character 29.

As a result, the enemy character 29 can be vibrated in accordance with the hit of the attack of the ally character 25 regardless of an action performed by the enemy character 29. Therefore, a response to the hit of the attack can be represented, so that the amusing property of the game can be improved.

Particularly in this embodiment, the motion addition processing part 19 adds the vibrating motion so that the enemy character 29 vibrates in the direction corresponding to the direction in which the character is attacked.

As a result, the enemy character 29 can be vibrated in accordance with the direction of the attack of the ally character 25. Therefore, the response to the hit of the attack can more naturally be represented.

Particularly in this embodiment, the game program drives the information processing device 3 to further act as the movement stop processing part 21 stopping the movement of the ally character 25 in a direction parallel to the field 27 regardless of a player's operation when the attack of the ally character 25 hits the enemy character 29.

This makes it possible to represent the response to the collision with the enemy character 29 and the weight of the enemy character 29, so that the amusing property of the game can be improved. For example, in a game in which the ally character 25 moves on the field 27 while routing a large number of the weak enemy characters 29w, the movement is stopped when the ally character 25 encounters and hits the strong enemy character 29s, so that the ally character 25 can be prevented from passing through the strong enemy character 29s and has difficulty in fighting. This makes it possible to represent the response to the collision and the weight of the enemy character when the strong enemy character 29s is the opponent while retaining the lightness and exhilaration of subduing the weak enemy characters 29w, and the ease of fighting can be improved. This is particularly effective in a game having a function of a dashing attack etc. enabling the ally character 25 to move faster than usual while attacking the enemy characters 29.

Particularly in this embodiment, the game program drives the information processing device 3 to further act as the attack determination processing part 23 determining whether the attack of the ally character 25 having hit the enemy character 29 is the short-range attack or the long-range attack, and the movement stop processing part 21 stops the movement of the ally character 25 when the attack is determined as the short-range attack.

In this embodiment, the movement of the ally character 25 is not stopped when the long-range attack hits the enemy character 29, and the movement of the ally character 25 is stopped only when the short-range attack hits the enemy character 29. As a result, the response to the collision and the weight of the enemy character 29 can be represented only when the attack is made near the enemy character 29, so that a more natural representation can be achieved.

Particularly in this embodiment, the movement stop processing part 21 stops the movement of the ally character 25 during execution of the attack motion, which is the action of the attack of the ally character 25 having hit the enemy character 29, and cancels the stop when the attack motion ends.

As a result, the ally character 25 can move or perform the next attack action at the same time as the end of the action of the hitting attack so that the ease of fighting is not impaired while the response to the collision with the enemy character 29 and the weight of the enemy character 29 are represented.

Particularly in this embodiment, the motion addition processing part 19 adds the vibrating motion having a different range w based on the type of the enemy character 29 hit by the attack of the ally character 25.

As a result, for example, the enemy character 29 equipped with soft and easily-shaking equipment and the enemy character 29 in a stable posture are vibrated with a small range w and, for example, the enemy character 29 equipped with hard and hardly-shaking equipment and the enemy character in an unstable posture can be vibrated with a large range w. As a result, the vibration caused by the vibrating motion can be prevented from becoming unnatural, and a more natural representation can be achieved.

7. Hardware Configuration of the Information Processing Device

An exemplary hardware configuration will be described for the information processing device 3 achieving the processing parts implemented by a program executed by the CPU 101 described above, with reference to FIG. 10.

As shown in FIG. 10, the information processing device 3 has the circuitry including a CPU 101, a ROM 103, a RAM 105, a GPU 106, a dedicated integrated circuit 107 constructed for specific use such as an ASIC or an FPGA, an input device 113, an output device 115, a storage device 117, a drive 119, a connection port 121, and a communication device 123. These constituent elements are mutually connected via a bus 109 and an input/output (I/O) interface 111 such that signals can be transferred.

The game program can be recorded in a ROM 103, the RAM 105, and the storage device 117 such as an hard disk device, for example.

The game program can also temporarily or permanently (non-transitory) be recorded in a removable recording medium 125 such as magnetic disks including flexible disks, various optical disks including CDs, MO disks, and DVDs, and semiconductor memories. The recording medium 125 as described above can be provided as so-called packaged software. In this case, the game program recorded in the recording medium 125 may be read by the drive 119 and recorded in the storage device 117 through the I/O interface 111, the bus 109, etc.

The game program may be recorded in, for example, a download site, another computer, or another recording medium (not shown). In this case, the game program is transferred through a network NW such as a LAN or the Internet and the communication device 123 receives this program. The program received by the communication device 123 may be recorded in the storage device 117 through the I/O interface 111, the bus 109, etc.

The game program may be recorded in appropriate external connection device 127, for example. In this case, the game program may be transferred through the appropriate connection port 121 and recorded in the storage device 117 through the I/O interface 111, the bus 109, etc.

The CPU 101 executes various process in accordance with the program recorded in the storage device 117 to implement the fight execution processing part 13, the motion addition processing part 19, the movement stop processing part 21, and the attack determination processing part 23, etc. In this case, the CPU 101 may directly read and execute the program from the storage device 117 or may be execute the program once loaded in the RAM 105. In the case that the CPU 101 receives the program through, for example, the communication device 123, the drive 119, or the connection port 121, the CPU 101 may directly execute the received program without recording in the storage device 117.

The CPU 101 may execute various processes based on a signal or information input from the input device 113 such as the game controller 5 described above, a mouse, a keyboard, and a microphone as needed.

The GPU 106 executes processes for displaying images such as a rendering processing based on a command of the CPU 101.

The CPU 101 and the GPU 106 may output a result of execution of the process from the output device 115 such as the display device 7 or an audio output device, for example. And the CPU 101 and the GPU 106 may transmit this process result to the communication device 123 or the connection port 121 as needed or may record the process result into the storage device 117 or the recording medium 125.

8. Modification Example Etc.

The present invention is not limited to the embodiment and may variously be modified without departing from the spirit and the technical ideas thereof.

For example, although the motion addition processing part 19 adds the vibrating motion only to the strong enemy character 29s without adding to the weak enemy character 29w, the vibrating motion may be added regardless of the type of the enemy characters. For example, if multiple attacks by the ally character 25 are required for defeating the weak enemy character 29w, the motion execution processing part 17 may add a vibrating motion (an example of the second motion) for vibrating the weak enemy character 29w to the fight motion (an example of the first motion) being executed by the weak enemy character 29w each time the attack of the ally character 25 hits the weak enemy character 29w until the enemy character is defeated. Even in this case, the same effect as the embodiment can be achieved.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:

1. A game processing method executed by an information processing device, comprising:
   moving an ally character on a field in accordance with a player's operation;
   executing a fight with an enemy character on the field in accordance with the player's operation when the ally character encounters the enemy character; and
   adding a second motion that is a shaking motion of the enemy character to a first motion that is movement, attack, or avoidance being executed by the enemy character so that the enemy character executes the second motion in conjunction with the first motion by adding a relative movement value from the first motion to the first motion, when an attack of the ally character hits the enemy character,
   wherein the adding the second motion comprises adding the second motion so that a shaking direction of the enemy character changes based on a direction of being hit by the attack of the ally character.

2. The game processing method according to claim 1, further comprising:
   stopping a movement of the ally character in a direction parallel to the field regardless of the player's operation when the attack of the ally character hits the enemy character.

3. The game processing method according to claim 2, further comprising:
   determining whether the attack of the ally character having hit the enemy character is a short-range attack or a long-range attack,
   wherein the stopping the movement comprises stopping the movement of the ally character when the attack is determined as the short-range attack.

4. A game processing method executed by an information processing device, comprising:
   moving an ally character on a field in accordance with a player's operation;
   executing a fight with an enemy character on the field in accordance with the player's operation when the ally character encounters the enemy character;
   adding a second motion that is a shaking motion of the enemy character to a first motion being executed by the enemy character, when an attack of the ally character hits the enemy character; and
   stopping a movement of the ally character in a direction parallel to the field regardless of the player's operation when the attack of the ally character hits the enemy character,
   wherein the stopping the movement comprises stopping the movement of the ally character during execution of a third motion that is an action of the attack of the ally character having hit the enemy character, and
   wherein the stopping the movement comprises cancelling a stop of the movement of the ally character when the third motion ends.

5. The game processing method according to claim 1, wherein the adding the second motion comprises adding the second motion has a different range based on a kind of the enemy character hit by the attack of the ally character.

6. The game processing method according to claim 4, wherein the adding the second motion comprises adding the second motion so that the enemy character shakes in a direction corresponding to a direction of being hit by the attack of the ally character.

7. The game processing method according to claim 4, further comprising:
  determining whether the attack of the ally character having hit the enemy character is a short-range attack or a long-range attack,
  wherein the stopping the movement comprises stopping the movement of the ally character when the attack is determined as the short-range attack.

8. The game processing method according to claim 4,
  wherein the adding the second motion comprises adding the second motion has a different range based on a kind of the enemy character hit by the attack of the ally character.

9. A non-transitory recording medium readable by an information processing device, the recording medium storing a game program programmed to cause the information processing device to:
  move an ally character on a field in accordance with a player's operation;
  execute a fight with an enemy character on the field in accordance with the player's operation when the ally character encounters the enemy character; and
  add a second motion that is a shaking motion of the enemy character to a first motion that is movement, attack, or avoidance being executed by the enemy character so that the enemy character executes the second motion in conjunction with the first motion by adding a relative movement value from the first motion to the first motion, when an attack of the ally character hits the enemy character,
  wherein the adding the second motion comprises adding the second motion so that a shaking direction of the enemy character changes based on a direction of being hit by the attack of the ally character.

* * * * *